(12) United States Patent
Sawant et al.

(10) Patent No.: US 11,150,897 B1
(45) Date of Patent: Oct. 19, 2021

(54) CODIFYING RULES FROM ONLINE DOCUMENTATION

(71) Applicant: Amazon Technologies, Inc., Seattle, WA (US)

(72) Inventors: Neela Sawant, Jersey City, NJ (US); Hoan Anh Nguyen, Bothell, WA (US); Srinivasan Sengamedu Hanumantha Rao, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/836,447

(22) Filed: Mar. 31, 2020

(51) Int. Cl.
    *G06F 8/73* (2018.01)
    *G06F 11/36* (2006.01)
    *G06F 16/2458* (2019.01)

(52) U.S. Cl.
    CPC .......... *G06F 8/73* (2013.01); *G06F 11/3616* (2013.01); *G06F 16/2465* (2019.01); *G06F 2216/03* (2013.01)

(58) Field of Classification Search
None
See application file for complete search history.

(56) References Cited

U.S. PATENT DOCUMENTS

| | | | | |
|---|---|---|---|---|
| 2005/0235248 | A1* | 10/2005 | Victoria | G06F 8/73 717/102 |
| 2010/0077351 | A1* | 3/2010 | Kaulgud | G06F 8/75 715/810 |
| 2011/0022551 | A1* | 1/2011 | Dixon | G06F 11/3616 706/12 |
| 2017/0091073 | A1* | 3/2017 | Abadi | G06F 8/20 |
| 2021/0149788 | A1* | 5/2021 | Downie | G06F 11/3604 |

OTHER PUBLICATIONS

Arnaoudova et al., "A New Family of Software Anti-Patterns: Linguistic Anti-Patterns," IEEE, 2013, 10pg. (Year: 2013).*
Bogner et al., "Towards a Collaborative Repository for the Documentation of Service-Based Antipatterns and Bad Smells," IEEE, 2019, 7pg. (Year: 2019).*
Rebai et al., "Interactive Refactoring Documentation Bot," IEEE, 2019, 11pg. (Year: 2019).*

\* cited by examiner

*Primary Examiner* — Ryan D. Coyer
(74) *Attorney, Agent, or Firm* — NDWE, LLP

(57) ABSTRACT

Techniques for generating rules from documentation are described. For example, a method for generating rules may include generating one or more templates containing patterns and anti-patterns from code of one or more documents, wherein a pattern captures a good coding practice as detailed in the documents and an anti-pattern is a proper subset of a pattern that does not include a construct described in the documents as being a recommended and/or required usage; constructing one or more graphs from the one or more templates; mining the constructed one or more graphs to find target sub-graphs which do not contain bugs, wherein a bug occurs when an anti-pattern matches, but a pattern does not match; comparing the target sub-graphs to a representative dataset to remove target sub-graphs that violate good usage; and codifying the sub-graphs that represent good usage.

20 Claims, 9 Drawing Sheets

SCHEMA BASED DOCUMENT 201

LISTING METRICS ⎯⎯ SUBJECT 203

TO LIST CLOUDWATCH METRICS, CREATE A LISTMETRICSREQUEST AND CALL THE CLOUDWATCHCLIENT'S LISTMETRICS METHOD. YOU CAN USE THE LISTMETRICSREQUEST TO FILTER THE RETURNED METRICS BY NAMESPACE, METRIC NAME, OR DIMENSIONS. ⎯⎯ HIGH-LEVEL TEXT 205

CODE EXAMPLE 207

THE METRICS ARE RETURNED IN A LISTMETRICSRESPONSE BY CALLING ITS LISTMETRICS METHOD.

THE RESULTS MAY BE PAGED. TO RETRIEVE THE NEXT BATCH OF RESULTS, CALL NEXTTOKEN ON THE RESPONSE OBJECT AND USE THE TOKEN VALUE TO BUILD A NEW REQUEST OBJECT. THEN CALL THE LISTMETRICS METHOD AGAIN WITH THE NEW REQUEST

⎯⎯ TEXT DESCRIPTION OF CODE 209

*FIG. 2*

```
                    Code example of Schema based document 207

CloudWatchClient cw =

CloudWatchClient.builder().build();

boolean done = false;
String next_token = null;

while(!done) {

ListMetricsResponse response;

if (next_token == null) {
              ListMetricsRequest request = ListMetricsRequest.builder()
                              .namespace(namespace)
                              .build();

response = cw.listMetrics(request);
       }
       else {
              ListMetricsRequest request = ListMetricsRequest.builder()
       .namespace(namespace)
       .nextToken(next_token)
       .build();

response = cw.listMetrics(request);
       }
    for(Metric metric : response.metrics()) {
       System.out.printf(
          "Retrieved metric %s", metric.metricName());
       System.out.println();
    }
    if(response.nextToken() == null) {
       done = true;
    }
    else {
         next_token = response.nextToken();
    }
}
```

*FIG. 3*

```
Generated template 401 class Template {
  CloudWatchClient cw = CloudWatchClient.builder().build();

void anti-pattern() {                                              ┐── ANTI-
    ListMetricsResponse response = cw.listMetrics(request);          │   PATTERN 403
  } void pattern() {
    boolean done = false; String next_token = null;
    while(!done) {
      ListMetricsResponse response;
      if (new_token == null) {
        ListMetricsRequest request = ListMetricsRequest.builder()
          .build();
        response = cw.listMetrics(request);
      }
      else {
        ListMetricsRequest request = ListMetricsRequest.builder()
          .nextToken(next_token)                                     ── PATTERN 405
          .build();
        response = cw.listMetrics(request);
      }
      if(response.nextToken() == null) {
        done = true;
      }
      else {
        new_token = response.nextToken();
      }
    }
  }
}
```

*FIG. 4*

CODIFYING RULES FROM ONLINE DOCUMENTATION

BACKGROUND

Documentation is the primary mode of communication to explain the logic, implementation, and use of software. For example, documentation provides examples of what to do and what not to do.

BRIEF DESCRIPTION OF DRAWINGS

Various embodiments in accordance with the present disclosure will be described with reference to the drawings, in which:

FIG. 2 illustrates an exemplary embodiment of a schema-based document that may include a code snippet and a description of the code snippet.

FIG. 3 illustrates an example of exemplary code that could be included in the code example section of the schema-based document.

FIG. 4 illustrates an example of a generated template according to some embodiments.

DETAILED DESCRIPTION

The present disclosure relates to methods, apparatus, systems, and non-transitory computer-readable storage media for finding rules in documentation.

Documentation can be used manually or automatically to identify software rules and best practices which can be incorporated in integrated development environment (IDE) plugins or code review tools. When new functionality is launched or existing functionality is modified, online official documents are often the first to reflect such change. Sometimes these changes are not reflected in any other sources, including code-generated specification files that might feed third party checkers. Unfortunately, the way to find rules and/or best practices is to manually look for them within documents.

Detailed herein are embodiments that programmatically codify rules and/or best practices in documents and publish the codified rules and/or best practices for use in code deployment and/or development. This provides an improved rule and/or best practice base as the format of the rule and/or best practice is more consistent and it is less likely that a rule and/or best practice will be missed.

Figure 1:
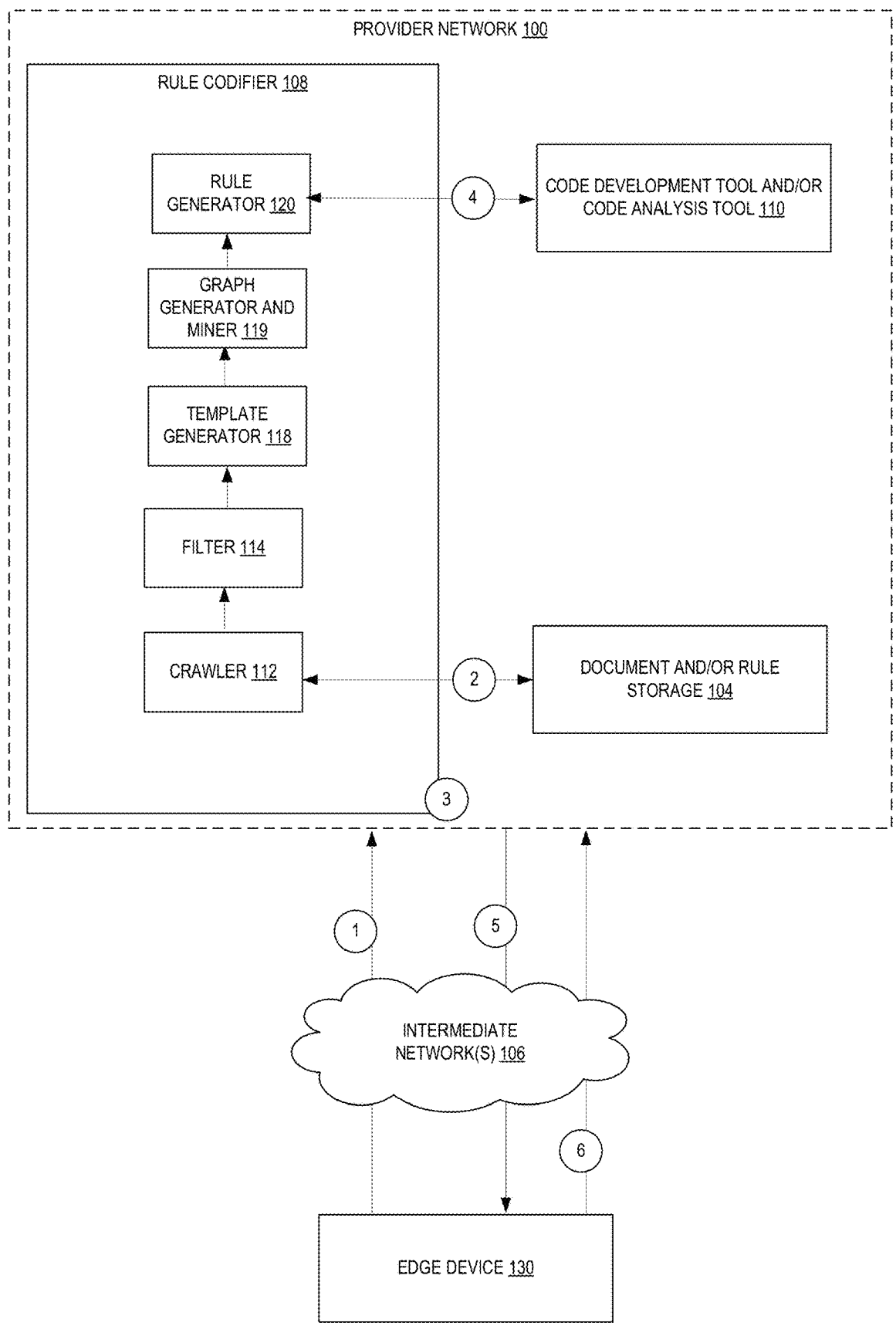
FIG. 1 illustrates embodiments of a system that provides document-based rule codification.

FIG. 1 illustrates embodiments of a system that provides document-based rule codification. As shown, a rule codifier 108 (e.g., a web service) retrieves documents and/or rules from a document and/or rule storage 104, mines those documents for content that may be applicable as a "rule," and then codifies rules from that mined content. In particular, the rules a usually associated with code development and/or code analysis tool 110 (e.g., an integrated development environment (IDE)) which may include a linter. Documents may come in many different forms including structured (XML, JSON, HTML, etc.) and unstructured (e.g., user posts).

In general, documentation of two broad categories can be leveraged by the rule codifier 108: 1) software documentation which is natural language data explaining rules and best practices of software that often contain small code examples to illustrate the point of discussion and 2) documented software which is programming language data containing actual code and often contains small textual snippets to explain the intended behavior, limitations of the code. Software documentation may include authoritative, formal documents, (such as API references and developer guides) and informal documents (such as software blogs). Formal documentation often exhibits a reasonably consistent local grammar or sentence structure because writers tend to model new documents after some shared templates. Note that freestyle text and/or code comments may also be leveraged for rules.

As shown, the rule codifier 108 may include one or more components. A crawler 112 crawls documents from the document and/or rule storage 104 to find documentation pages that include at least one code snippet. Documentation pages may be schema-based or freeform. For the sake of brevity, the following discussion focuses on schema-based documentation. However, the basic flow of crawling, filtering, etc. is applicable to freeform documentation.

FIG. 2 illustrates an exemplary embodiment of a schema-based document that may include a code snippet and a description of the code snippet. As indicated by the name, a schema-based document 201 follows a dictated format. In this example, a subject 203 of listing metrics is described in detail. Note that not all of the components of the schema are always present. For example, not all schema-based documents have a code example.

As part of the detail includes high-level text 205 describe this listing metrics function. In this example, the high-level text 205 describes a how to call for metrics using a "listMetrics" method calls, and how to filter the results of what is returned using "ListMetricsRequest."

A code example 207 provides exemplary code using one or more described methods. This code may be commented to explain what the lines of code are doing (aside for the method calls detailed in the high-level text 205). FIG. 3 illustrates an example of exemplary code that could be included in the code example 207 section of the schema-based document 201.

A textual description 209 of the code example may also be included. A textual description 209 of the code example may include a discussion of the code example itself. In this case, it describes the necessary steps to access paginated results in their entirety (e.g., pagination).

Typically, only a proper subset of documentation pages that contain code snippets can be turned into rules. As such, the documentation pages are, in some embodiments, subjected to a filter 114 to remove (filter out) documentation pages that will not result in rules. For example, a page that has interleaved text and code snippets, but only describes "facts" about coding, and not best practices, would be filtered out. In some embodiments, heuristics are used to remove such pages. For example, looking for keywords such as "note" and "important" may provide clues as to what are best practices. The description of "camel case" tokens (e.g., words that have capital letters in the middle such as getItem) in the code description may also indicate code that can be turned into rules.

As shown in FIG. 1, a template generator 118 generates a template per (unremoved) code snippet for "patterns" and "anti-patterns." A pattern is a set of core code constructs that capture a good coding practice described in the document such as listMetrics, ListMetricsRequest, etc. from the example. In some embodiments, a core code construct is a set of tokens that appear in the text and code example. This may be a one to many mappings. In some embodiments, a neural network is applied to learn the mapping between the code example and text. Anti-pattern is a proper subset of a pattern, containing some of the same statements as the pattern (the context), but missing key constructs essential to qualify as best practice (the recommendation). Core constructs are identified, in some embodiments, by joint modeling of text and code constructs (tokens, abstract syntax tree, and/or data and control flow). In some embodiments, a template is generated using keyword matching. For example, a pattern is created using lines of code that contain the tokens (e.g., camel case tokens) named in the text such as listMetrics, nextToken, etc. Anti-patterns are created in some embodiments by dropping one or more named tokens in the text. In some embodiments, the matching of code and text is based on neural embeddings of the code and text. For example, mapping of a while/do, for, etc. loop structure to text keywords (do again/repeat/while). Note that there can be more than one anti-pattern and some of them can even be invalid.

FIG. 4 illustrates an example of a generated template according to some embodiments. As shown, the generated template 401 is for the code from FIG. 3. The pattern 405 is a proper subset of the while loop of the code from FIG. 3. Aspects that are not core (such as the namespace and the printout) are not included. However, all of the method calls of "listMetrics" are included. The anti-pattern 403 includes just the method calls of "listMetrics," but without pagination handling.

A graph generator and miner 119 takes the generated template(s) and generates one or more graphs. These graphs are then mined to look for patterns that are of interest for potential rule generation. Codified rules may be for rules for a lint (or linter), etc. The populated rules may then be used as a part of a code development tool and/or code analysis tool 110 during application development.

Figure 5:
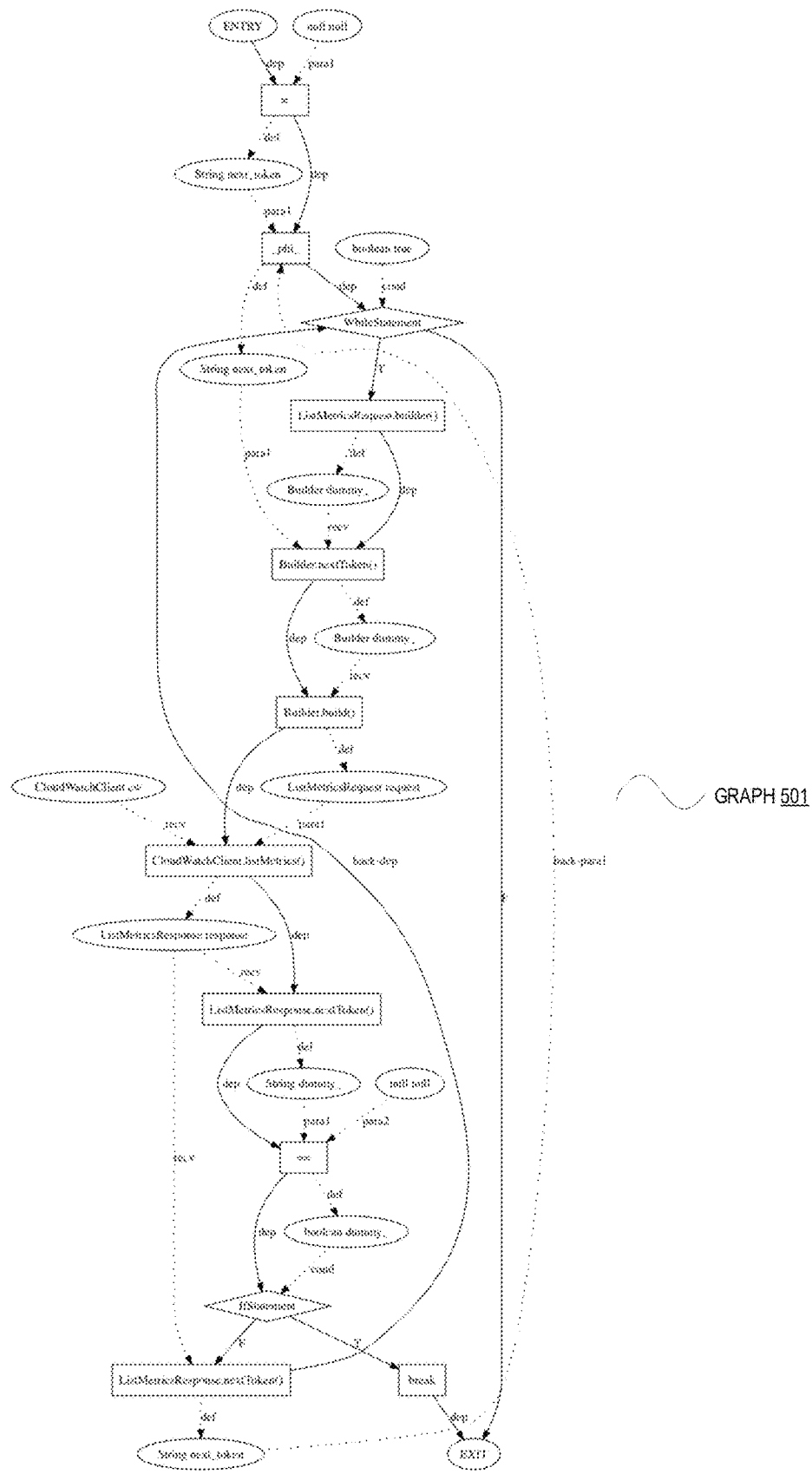
FIG. 5 illustrates an example of a generated graph from a template according to some embodiments.

In some embodiments, the generated graph is a directed graph with attributed nodes and edges. FIG. 5 illustrates an example of a generated graph from a template according to some embodiments. The nodes of the graph include data nodes (in ellipse shapes) such as variables, constants and literals; action nodes in box shapes) such operations on data such as method calls, arithmetic and logical operations; control nodes (in diamond shapes) such control points in the program such as if and for/while statements; and entry and exit nodes.

Edges connect nodes in the graph. Data edges (dotted edges) represent the flow of data between nodes. In this example. "def" is from an action node to a data node for defining the value of the data; "recv" is from a receiver object to a method call; "para" is from a data node to an action as the parameter of the action; and "cond" is from a data node to a control node as the condition of the control. Control edges (solid edges) represent the control flow or execution order between nodes. In this example, "dep" is a normal control flow between two nodes and "throw" is an exception flow from an action node to a catch clause node.

The graph is recursively built bottom-up from expressions to statements. The graphs for statements are merged sequentially if they are sequential in the code or in parallel if they are in different branches of a control structure.

The illustrated graph is built from the following code segment:
```
void pattern( ) {
String next_token=null;
while(true) {
  ListMetricsRequest
    request=ListMetricsRequest.builder( ).nextToken
    (next_toke n).build( );
  ListMetricsResponse response=cw.listMetrics(request);
  if(response.nextToken( )==null) {
    break;
  }
  next_token=response.nextToken( );
}
}
```

In some embodiments, from this reference graph of the sample code and a database of usage graphs (e.g., other code), a modified apriori sub-graph mining algorithm is used to mine usages of the reference. The modified algorithm places more importance on the core constructs of the reference. If a graph is frequent with respect to a frequency threshold, any of its sub-graphs are also frequent. In some embodiments, the apriori sub-graph mining algorithm begins by identifying frequent nodes (such as size-1 graphs). The algorithm then explores the larger frequent graphs by extending current graphs with one neighbor node at a time. Both starting step and extending steps are guided by the core constructs of the reference graph. Unlike a traditional apriori sub-graph mining algorithm which can start with any frequent node, the modified apriori sub-graph mining only uses frequent nodes that have been pre-selected based on collocated text. When extending a graph, it will only extend with other nodes that are also part of the reference graph. The subgraph mining may produce more than one frequent sub-graphs. A match is a frequent sub-graph whose size, in term of the number of nodes, exceeds a threshold and whose frequency exceeds a threshold. This process of finding matches is repeated for both patterns and anti-patterns of the reference template along with a determination of a frequency of occurrence for each. When a pattern and its anti-pattern are equally frequent, then the anti-pattern cannot exist outside of the pattern and are not of interest for a codified rule. Rather, instances where a pattern occurs relatively fewer times than the anti-pattern and both exceed some predetermined frequency and/or size thresholds are the basis for rules.

In some embodiments, change history information is used to find patterns and anti-patterns. For example, one or more graphs are built from the code snippet. The nodes of these graphs are matched with keywords to identify key nodes. For each change in the change history information, one or more graphs are built for the "buggy" and "fixed" code snippet versions. When the one or more graphs for the fixed code contains all of the key nodes and most of the nodes in the one or more graphs built from the code snippet, a difference calculation between the buggy and fixed graphs is made with respect to the code snippet graph(s) and the key nodes to identify a set of nodes that are not in the buggy graph(s) and are a subset of the key nodes. This set of nodes are core constructs that leads to a bug. In some embodiments, a change can be found by looking for keywords indicating a fix activity in a log message and/or associate comment. In some embodiments, mining of the frequent nodes appearing in all the set of nodes that are not in the buggy graph(s) and are a subset of the key nodes can increase the confidence of the core constructs. A bug occurs when an anti-pattern matches, but a pattern does not match. To find bugs, a rule generator 120 compares the frequencies of patterns and anti-patterns against usage specific (e.g., in terms of the API, etc.) thresholds to determine a good usage. For example, in some instances, where the patterns and corresponding anti-patterns exceed some frequency and/or size threshold to determine which patterns represent a "good" usage. Patterns that are "good" are codified and are stored and/or provided to a code development tool and/or code analysis tool 110.

In some embodiments, to make a further determination of which patterns are good, the rule generator 120 uses a set of graphs representing good usages (e.g., a different repository of code) and a given input rule to determine if input rule violates those good usage(s). A usage (method) violates a pattern if its graph is very similar but not exactly matched the good usage's graph and/or if it violates at least one good usage and is not matched any good usage. A graph is considered a match to a good usage's graph if it is a sub-graph of the good usage's graph. The similarity between a target graph and a good usage's graph is the ratio between the size of their maximum common subgraph over the size of the good usage's graph. Note that the repository to compare for finding bugs may be different than the repository than the sub-graph mining.

In some embodiments, one or more of the rule codifier 108, the document and/or rule storage 104, and the code development tool and/or code analysis tool 110 are provided as services of a provider network. A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

The circles with numbers inside illustrate an exemplary flow of operations. At circle 1, an edge device 130 sends a request to the rule codifier 108 to look at stored documents and codify rules from those documents. Examples of formats for requests are detailed herein. Additionally, in some embodiments, the rule codifier 108 does not re-populate rules that already exist unless an aspect of the rules has changed.

At circle 2, the rule codifier 108 acquires documentation from the document and/or rule storage 104 and at circle 3 the rule codifier 108 analyzes that documentation for rules as detailed herein.

At circle 4, the rule codifier 108 integrates the generated (e.g., populated) rules into the code development tool and/or code analysis tool 110. Note that this may not always happen.

At circle 5, the rule codifier 108 sends an indication that the analysis is complete to the requesting edge device 130. In some embodiments, the rule codifier 108 indicates where the rules are stored (or where they were integrated). In some embodiments, the rule codifier 108 provides the rules to the requesting edge device 130 for it to incorporate into a code development tool and/or code analysis tool.

And, at circle 6, the edge device 130 utilizes the code development tool and/or code analysis tool 110 with the generated rules.

Figure 6:
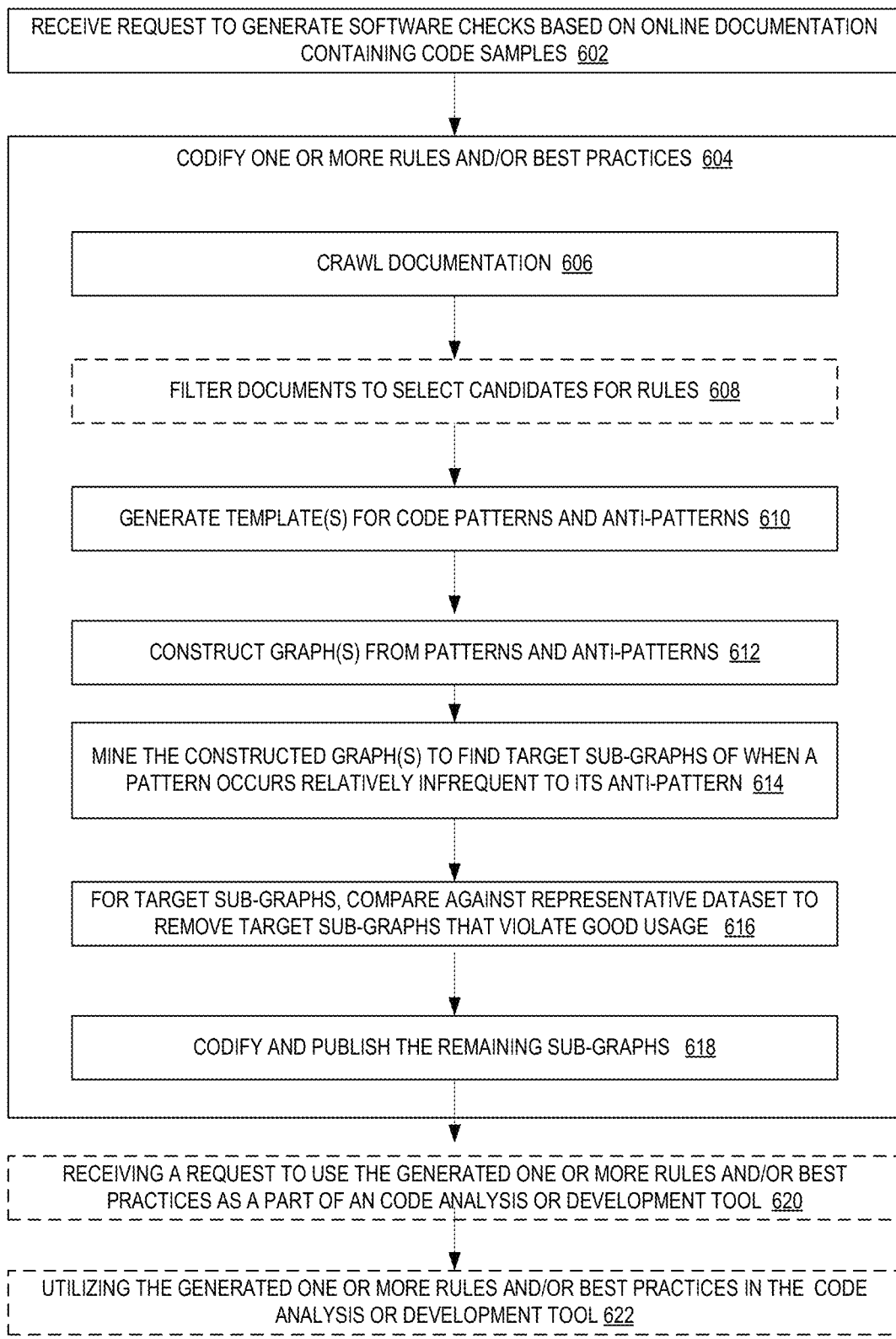
FIG. 6 is a flowchart illustrating a method for generating a graph from a template according to some embodiments.

FIG. 6 is a flowchart illustrating a method for generating a graph from a template according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the rule codifier 108 of the other figures.

At 602, a request is received to codify rules and best practices from code in documentation. For example, an edge device requests that rules and/or best practices are codified from documentation. In some embodiments, the request includes one or more of an identifier of documentation or locations thereof, an identifier of the requester, an identifier of a location to store the rules, etc. For example, a request is received by the rule codifier 108 which identifies particular documents of document and/or rule storage 104.

At 604, one or more rules and/or best practices are codified from the code of online documentation. This codification may include several operations. In some embodiments, the online documentation is crawled to look for documentation that contains code at 606. Documents that do not include code may still have rules generated, but not using this approach.

In some embodiments, a filter is applied to the documents that have code to eliminate those documents that do not look like they will be good candidates for the codification of code-based rules at 608. For example, filters looking for camel cases tokens, notes indicating importance, etc. may be applied.

One or more templates for code patterns and anti-patterns are generated at 610. Details of such generation have been detailed above.

One or more graphs are constructed from patterns and anti-patterns at 612. The graphs allow for the one or more templates to be refined. In some embodiments, noise is removed from the one or more graphs where noise is a subset of lines that contain tokens of interest, but that are not a part of typical usage. For example, print and logging code, or code that uses the output for a specific task.

At 614, the constructed one or more graphs are mined to find target sub-graphs of one or more patterns (of a certain number of nodes) that occur relatively infrequently compared to its anti-pattern.

The target sub-graphs are compared against a representative dataset to remove target sub-graphs that violate good usage (e.g., remove bugs) at 616. Those target sub-graphs that remain may then be codified into rules and/or best practices and published at 618. Publication may include incorporating into an IDE, making available for accessing, etc.

In some embodiments, a code evaluation request is received to use the generated rules to evaluate code at 620. The generated rules are used as a part of a code analysis or development tool.

In some embodiments, the code analysis or development tool utilizes the generated rules to evaluate the code according to the code evaluation request at 622.

Figure 7:
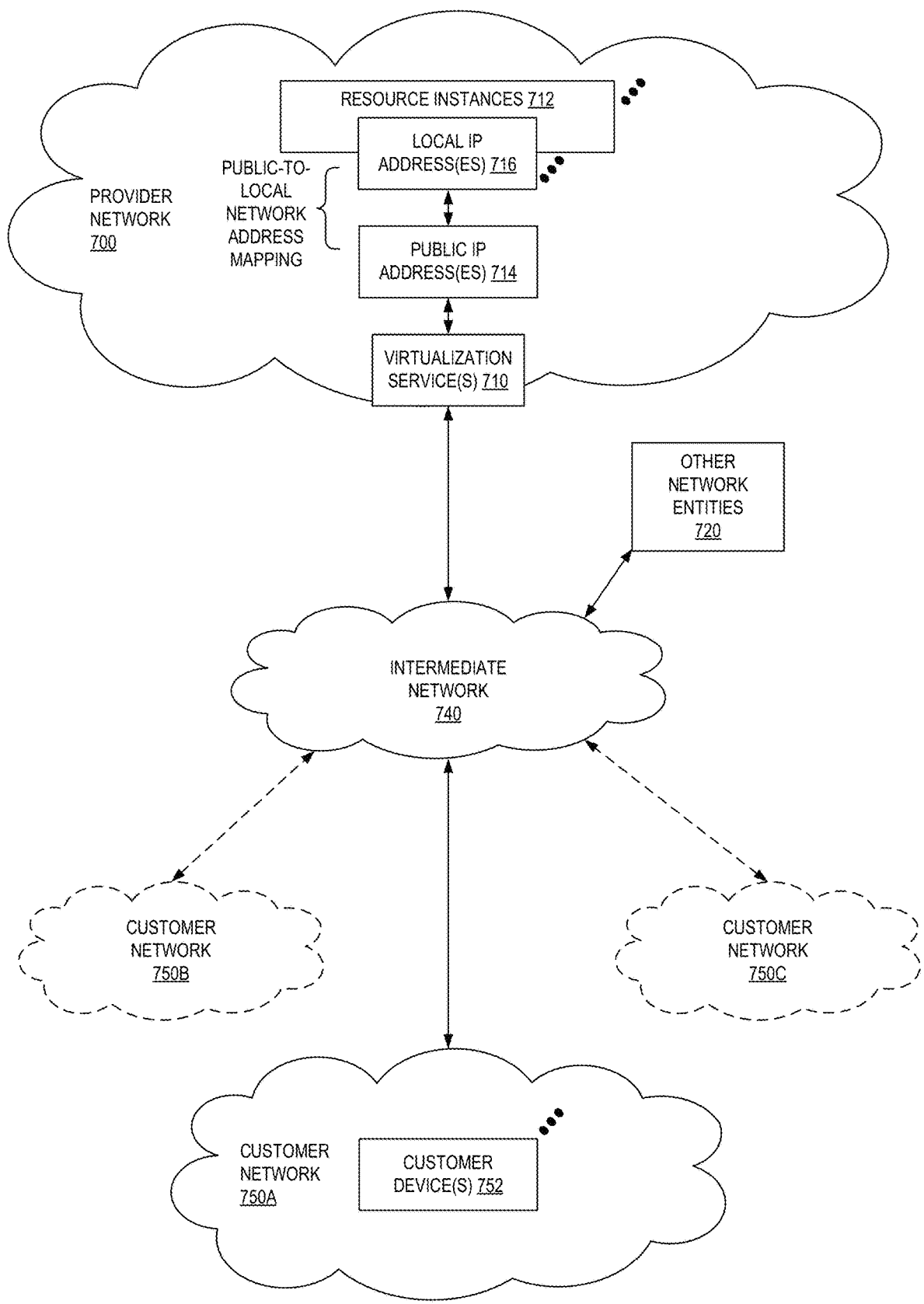
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
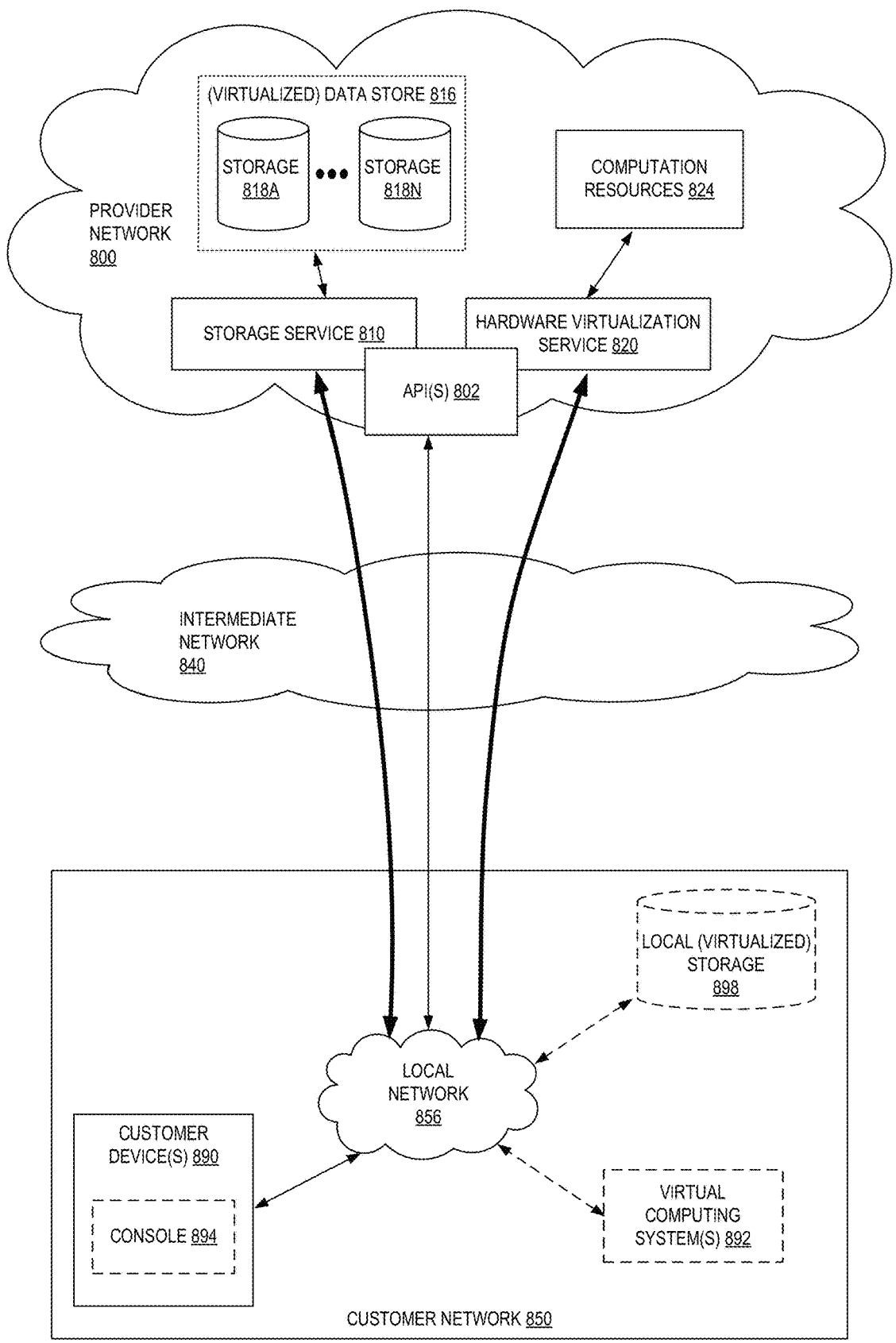
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative Systems

Figure 9:
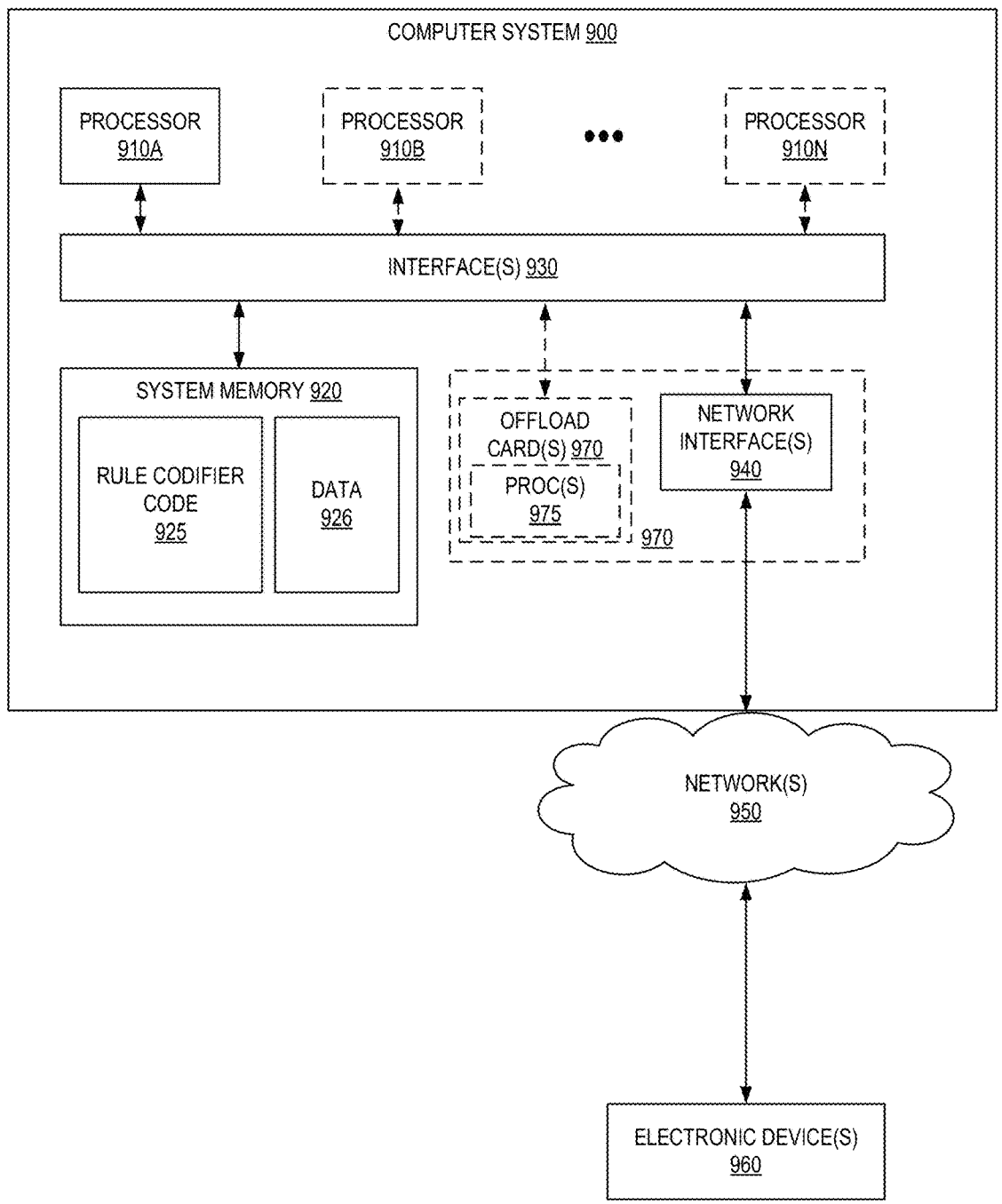
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as document miner and rule generator service code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a request to evaluate documentation including code to codify at least one rule from the code;
codifying one or more rules from the documentation by:
generating one or more templates containing patterns and anti-patterns from the code, wherein a pattern captures a good coding practice as detailed in the documentation and an anti-pattern is a proper subset of a pattern that does not include one or more constructs described in the documentation as being a recommended and/or required usage,
constructing one or more graphs from the one or more templates, mining the constructed one or more graphs to find target sub-graphs for one or more patterns that occur relatively infrequently to its anti-pattern, comparing the target sub-graphs to a representative dataset to remove target sub-graphs that violate good usage, and codifying the sub-graphs that do not violate good usage;

integrating the codified rules into a code analysis and recommendation tool; and utilizing the integrated rules of the code analysis and recommendation tool to evaluate code.

2. The computer-implemented method of claim 1, wherein the request includes an identifier of a location for the documents and an identifier of the integrated development environment.

3. The computer-implemented method of claim 1, wherein the documentation is text-based.

4. A computer-implemented method comprising:

generating one or more templates containing patterns and anti-patterns from code of one or more documents, wherein a pattern captures a good coding practice as detailed in the documents and an anti-pattern is a proper subset of a pattern that does not include a construct described in the documents as being a recommended and/or required usage;

constructing one or more graphs from the one or more templates;

mining the constructed one or more graphs to find target sub-graphs which do not contain bugs, wherein a bug occurs when an anti-pattern matches, but a pattern does not match;

comparing the target sub-graphs to a representative dataset to remove target sub-graphs that violate good usage; and codifying the sub-graphs that represent good usage.

5. The computer-implemented method of claim 4, wherein one or more of the one or more documents are based on a text-based schema.

6. The computer-implemented method of claim 4, wherein one or more of the one or more documents are freeform.

7. The computer-implemented method of claim 4, wherein the one or more documents include text indicating best practices for the code.

8. The computer-implemented method of claim 4, further comprising:

filtering the one or more documents to remove documents that do not contain camel case text.

9. The computer-implemented method of claim 4, wherein the mining the constructed one or more graphs to find target sub-graphs for one or more patterns that do not contain bugs comprises finding target sub-graphs whose size in number of nodes is above a threshold.

10. The computer-implemented method of claim 4, wherein the generated one or more rules are published to a location accessible to a code developer.

11. The computer-implemented method of claim 4, wherein the documentation includes text-based documentation include one or more of XML documents, JSON documents, and HTML documents.

12. The computer-implemented method of claim 4, wherein generating one or more templates containing patterns and anti-patterns from code of one or more documents, wherein a pattern captures a good coding practice as detailed in the documentation and an anti-pattern is a proper subset of a pattern that does not include a construct described in the documentation as being a recommended and/or required usage comprises performing keyword matching to create patterns and dropping one or more tokens from the keyword matches to create anti-patterns.

13. The computer-implemented method of claim 4, further comprising:

incorporating the generated one or more rules into a linter.

14. The computer-implemented method of claim 4, further comprising:

incorporating the generated one or more rules into an integrated development environment.

15. A system comprising:

storage for a plurality of documents; and one or more electronic devices to implement a rule codifier service in the multi-tenant provider network, the rule codifier service including instructions that upon execution cause the rule codifier service to:

generate one or more templates containing patterns and anti-patterns from code of one or more documents of the storage, wherein a pattern captures a good coding practice as detailed in the documents and an anti-pattern is a proper subset of a pattern that does not include a construct described in the documents as being a recommended and/or required usage, construct one or more graphs from the one or more templates, mine the constructed one or more graphs to find target sub-graphs which do not contain bugs, wherein a bug occurs when an anti-pattern matches, but a pattern does not match, compare the target sub-graphs to a representative dataset to remove target sub-graphs that violate good usage, and codify the sub-graphs that represent good usage.

16. The system of claim 15, wherein one or more of the one or more documents are based on a text-based schema.

17. The system of claim 15, wherein one or more of the one or more documents are freeform.

18. The system of claim 15, wherein the one or more documents include text indicating best practices for the code.

19. The system of claim 15, wherein rule codifier service is to filter the one or more documents to remove documents that do not contain camel case text.

20. The system of claim 15, wherein the documentation includes text-based documentation include one or more of XML documents, JSON documents, and HTML documents.

* * * * *